United States Patent Office 3,401,371
Patented Sept. 10, 1968

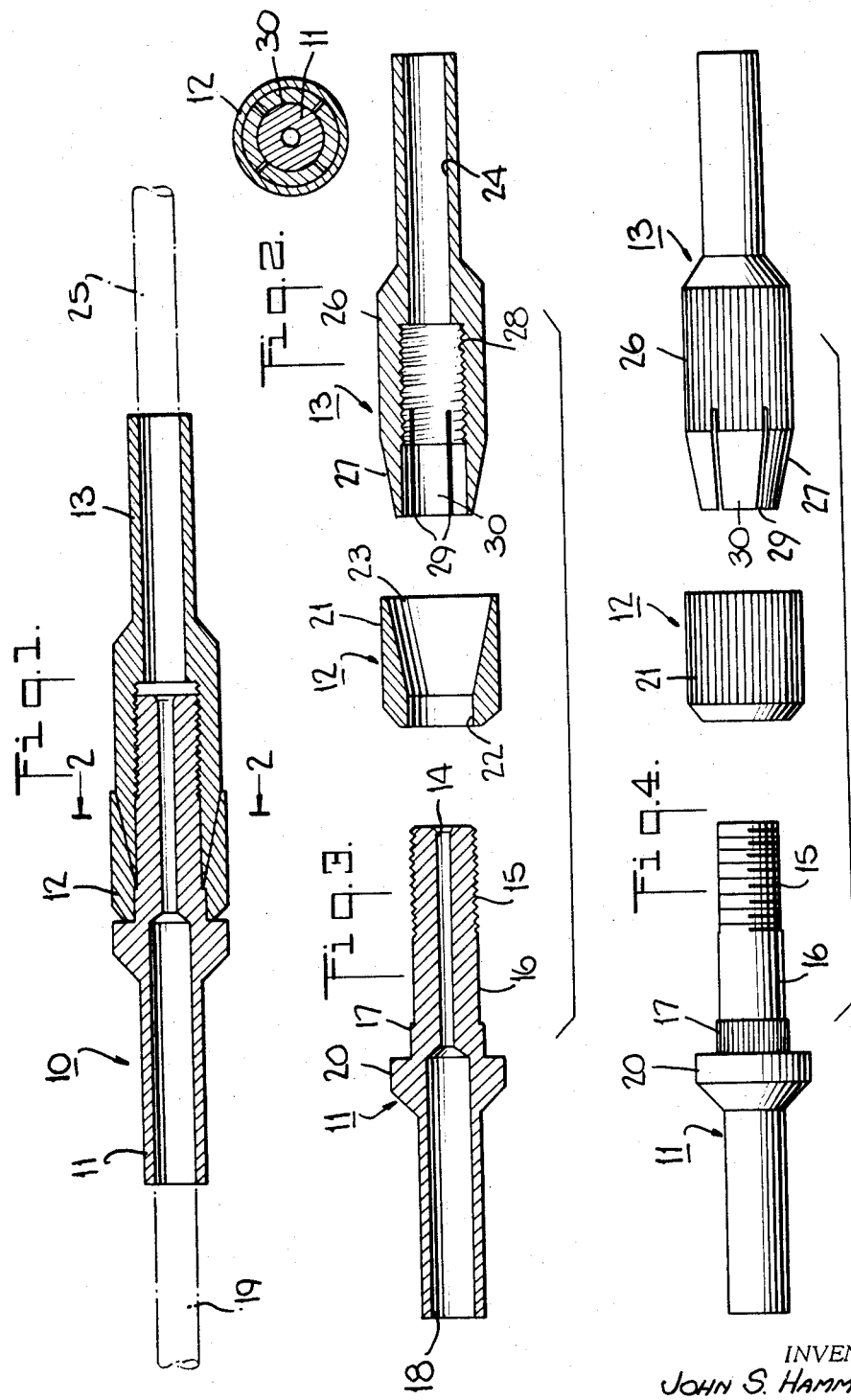

3,401,371
FERRULE FOR CONNECTING ANTENNAE TOGETHER
John S. Hammond, Newberry, S.C., assignor to Columbia Products Company, Columbia, S.C., a corporation of South Carolina
Filed Apr. 27, 1966, Ser. No. 545,665
7 Claims. (Cl. 339—268)

ABSTRACT OF THE DISCLOSURE

The female terminal element having a tapered and slotted end portion is threaded into the cavity formed by the male element and ring element so that the fingers are both compressed against the male terminal element and held in place by a friction fit. The ring element is fixed on the male terminal element to define the cavity.

---

This invention relates to a ferrule for an antenna. More particularly, this invention relates to a ferrule connector for antenna. Still more particularly, this invention relates to a detachable ferrule connector for electrically or mechanically joining antenna.

Heretofore, connectors have been used to connect various types of wires, cables, cord extensions and the like either electrically or mechanically. These connectors have been used either for permanent or temporary connections and, in the latter cases, have been adapted for frequent connection and disconnection. However, these connectors have either necessarily utilized a great number of parts to effect a suitable connection or have utilized parts which are so cumbersome that it has not been possible to obtain a simple, efficient connection.

Accordingly, it is an object of this invention to provide a ferrule connection which utilizes a minimum of components.

It is another object of this invention to provide a ferrule connection which can be easily and simply made.

It is another object of this invention to provide a ferrule connection which can be repeatedly connected and disconnected a great number of times without damage to the components of the ferrule connector or the parts being connected.

It is another object of this invention to provide a ferrule connector which effectuates an efficient electrical and mechanical bonding of the separable components thereof without loosening under vibration.

It is another object of this invention to provide a ferrule connector having a pair of mating terminal elements fitting together axially in a manner to be locked together by a rotation of one element with respect to the other and to be released by a reverse rotation.

It is another object of this invention to provide a ferrule connector which can be manually manipulated to connect a pair of wires together.

Generally, this invention provides a ferrule connection for a pair of wires having three interengaging components. One of these interengaging components comprises a male terminal element having a threaded end portion and a knurled portion adjacent to the threaded end portion. A second of the interengaging components comprises a ring element press-fitted on the knurled portion of the male terminal element. The ring element has an internal bore which has a cylindrical portion fitted to the male terminal element and a conical portion extending outwardly over the threaded portion of the male terminal element. The third interengaging component comprises a female terminal element having an internally threaded bore for threaded engagement with the threaded end portion of the male terminal element and a conically shaped slotted portion extending outwardly from the threaded bore for mating engagement with the control portion of the ring element. Upon continous threading of the male terminal element into the female terminal element, the mating conical portions of the ring and female terminal elements are pressed against each other with increasing force so as to create frictional locking forces between the respective interengaging members. The creation of the frictional locking forces is facilitated by the slots of the conical portion of the female terminal portion in that the finger portions formed by the slots are sufficiently resilient to deform inwardly under the wedging action of the ring element to create increasing frictional bearing forces between the ring and female terminal elements.

When secured together the interengaging components of the ferrule connector form a simple, efficient mechanical bond between the wires being connected. Further, when made of suitable material, the ferrule connector forms an electrical bond between the connected wires.

These and other objects and advantages of the invention will become more apparent from the following detailed description and appended claims taken in conjunction with the accompanying drawings in which:

FIG. 1 illustrates a cross-sectional view of a ferrule of this invention;
FIG. 2 illustrates a view taken on line 2—2 of FIG. 1;
FIG. 3 illustrates an exploded view of the ferrule of FIG. 1; and
FIG. 4 illustrates an exploded view of the ferrule components.

Referring to the drawings, the ferrule 10 of the invention includes a male terminal element 11, a cylindrical ring element 12, and a female terminal element 13 which are interengaged.

The male terminal element 11 is formed at one end with a bore 14, an externally threaded portion 15, a smooth shank portion 16 adjacent the threaded portion 15 and a raised knurled surface portion 17 adjacent the shank portion 16. However, it is noted that the threaded portion 15 can extend to the raised knurled portion 17, where such is desired. The other end of the male terminal element 11 is formed with an internal counter bore 18 which is in communication with the bore 14 and which is adapted to receive a suitable electrically conductive wire or antenna 19 which can be secured therein in any suitable manner. In addition, a shoulder 20 is formed intermediately on the male terminal element 11 adjacent the raised knurled surface portion 17 to form an abutment therefor.

The cylindrical ring element 12 is formed with a cylindrical knurled external surface 21 and an internal bore extending therethrough. The bore has a cylindrical portion 22 which is dimensioned to fit over the knurled surface portion 17 of the male terminal portion 11 with a press-fit and an internal conical portion 23 which is dimensioned to extend in concentric spaced relation over the shank portion 16 and threaded portion 15 of the male terminal element 11.

The female terminal element 13 is formed with an internal bore 24 which is sized for the reception of a suitable electrically conductive wire or antenna 25, an intermediate raised knurled portion 26 and a conically surfaced portion 27 which extends from the knurled portion 26 to the end of the element 13. In addition, the bore 24 is provided with a threaded portion 28 sized for threaded engagement with the threaded portion 15 of of the male terminal element 11 and the conically surfaced portion 27 is provided with a plurality of longitudinally extending slots 29 which extend into the threaded portion 28 of the bore 24.

In use, the ring element 12 is press-fitted onto the raised knurled portion 17 of the male terminal element 11 against the shoulder 20 so that a tapered cavity is formed between the internal conical portion 23 and the threaded shank portions 15 and 16. The interengagement of the ring and male terminal elements is such that for normal usage it is a permanent engagement.

Subsequently, with the respective conductive wires 19, 25 in place, the female terminal element 13 is threaded onto the threaded portion 15 of the male terminal element 11 until the conically surfaced portion 27 is brought into mating engagement with the conical portion 23 of the ring element 12 within the cavity formed by the ring and male terminal elements. Thereafter, a subsequent turn in the locking direction of the female terminal element 13 with respect to the male terminal element 11 causes the finger portions 30 formed by the slots 29 to deform inwardly together closing the slots 29 so that the conically surfaced portion 27 is circumferentially compressed by the wedging action of the ring element to create an increasing frictional locking force between the female terminal element 13 and the unit formed by the ring and male terminal elements 11, 12.

Thus, by simply threading one of the terminal elements onto the other an efficient ferrule connection is effected.

It is noted that the material of the elements which make up the ferrule 10 is of suitable electrical conductivity to effect an effective electrical bond between the connected antennae 19, 25. Also, is noted that each antenna is secured within the respective terminal element 11, 13 to obtain an effective mechanical and electrical bond therewith.

Because of the minimum of elements used, the threaded construction of the terminal elements and the mating locking engagement of the female terminal element within the cavity formed by the ring and male terminal elements, an electrically and mechanically efficient ferrule connection can be rapidly and easily obtained in a simple manner. Further, such a connection can be repeatedly connected and disconnected a great number of times without damage to the antenna or ferrule elements.

The invention thus provides a ferrule which is simple to manufacture, assemble and use, and which achieves an economical mechanical and electrical connection of antenna.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A ferrule for mechanically and electrically joining antennae comprising a male terminal element having a first bore for receiving a first antenna therein in conductive relation; a ring element fixedly secured to said male terminal element, said ring element having an internal conical portion extending in concentrically spaced relation over said male terminal element to form a cavity therewith; a female terminal element having a second bore for receiving a second antenna therein in conductive relation, said female terminal element having a conically surfaced end portion received within said cavity in mating engagement with said internal conical portion of said ring element; and securing means frictionally locking said conically surfaced end portion in said cavity.

2. A ferrule as set forth in claim 1 wherein said securing means includes mating threaded portions on said male terminal element and said female terminal element.

3. A ferrule as set forth in claim 1 wherein said male terminal element is provided with a raised knurled portion in press-fit engagement with said ring element thereon.

4. A ferrule as set forth in claim 3 wherein said male terminal element is provided intermediately with a shoulder in abutment with said ring element.

5. A ferrule as set forth in claim 1 wherein said conically surfaced end portion of said female terminal portion is provided with a plurality of longitudinal slots forming a plurality of finger portions which are adapted to be radially deformed upon mating with said internal conical portion.

6. A ferrule as set forth in claim 1 wherein said elements are electrically conductive.

7. A ferrule as set forth in claim 1 wherein said elements are axially aligned.

References Cited

UNITED STATES PATENTS 1,649,923 11/1927 Post _____ 174—94 XR
2,779,930 1/1957 Archer _____ 339—270

DARRELL L. CLAY, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,371                               September 10, 1968

John S. Hammond

It is certified that error appears in the above identified patent and that said Letters Patent are hereby corrected as shown below:

Column 2, line 2, "control" should read -- conical --.
Column 3, line 28, after "Also," insert -- it --.

Signed and sealed this 3rd day of March 1970.

(SEAL)
Attest:

Edward M. Fletcher, Jr.
Attesting Officer

WILLIAM E. SCHUYLER, JR.
Commissioner of Patents